No. 743,599. PATENTED NOV. 10, 1903.
T. UTLEY.
SHIP'S AIR AND LIGHT PORT.
APPLICATION FILED FEB. 5, 1903.
NO MODEL. 4 SHEETS—SHEET 2.
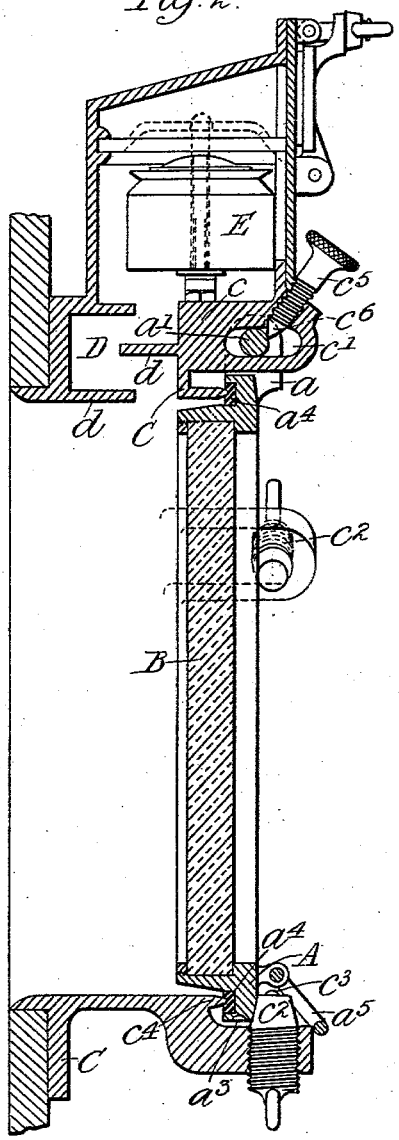
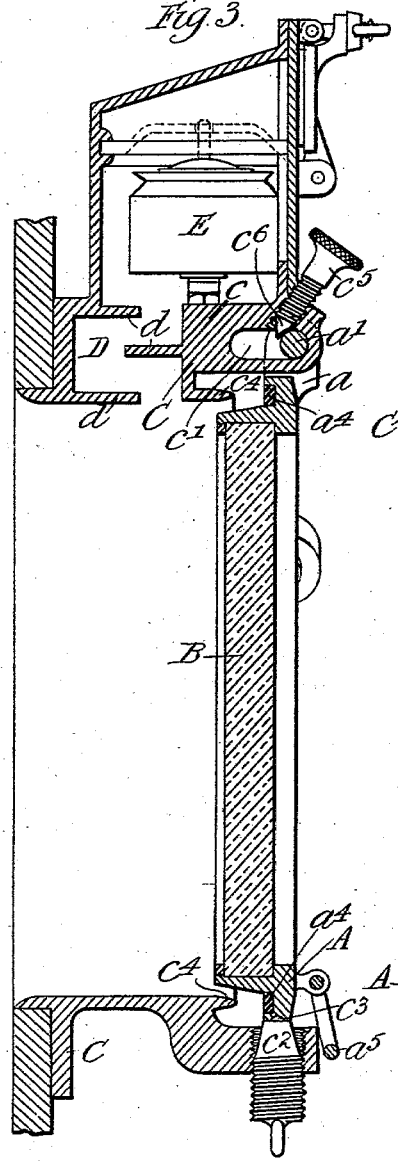
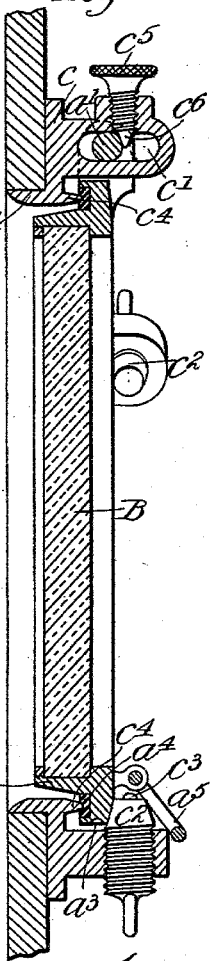

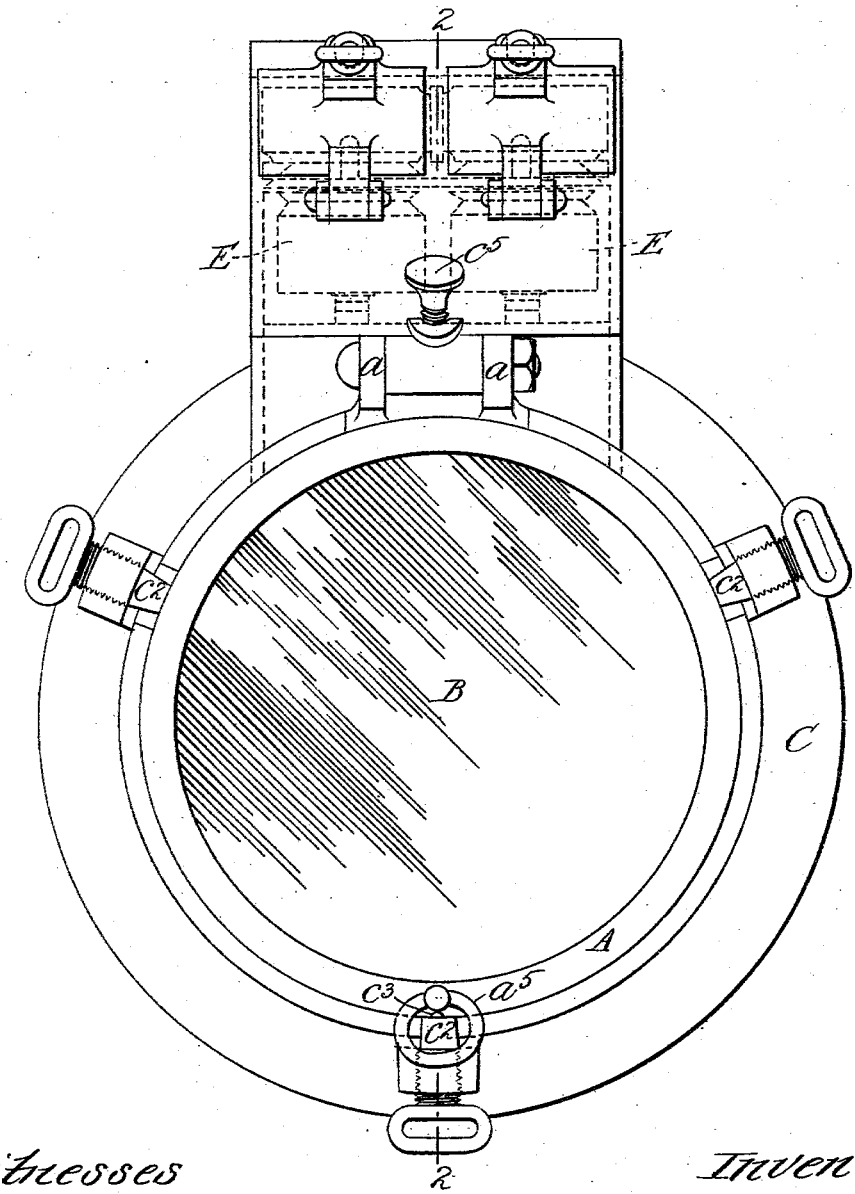

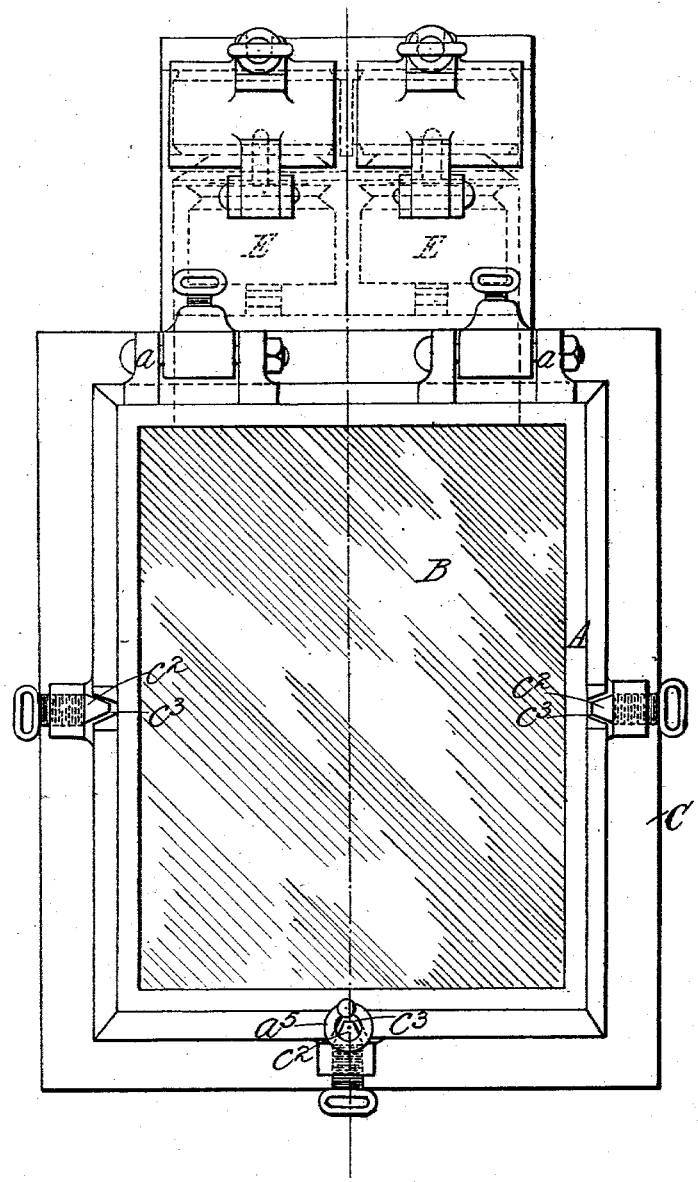

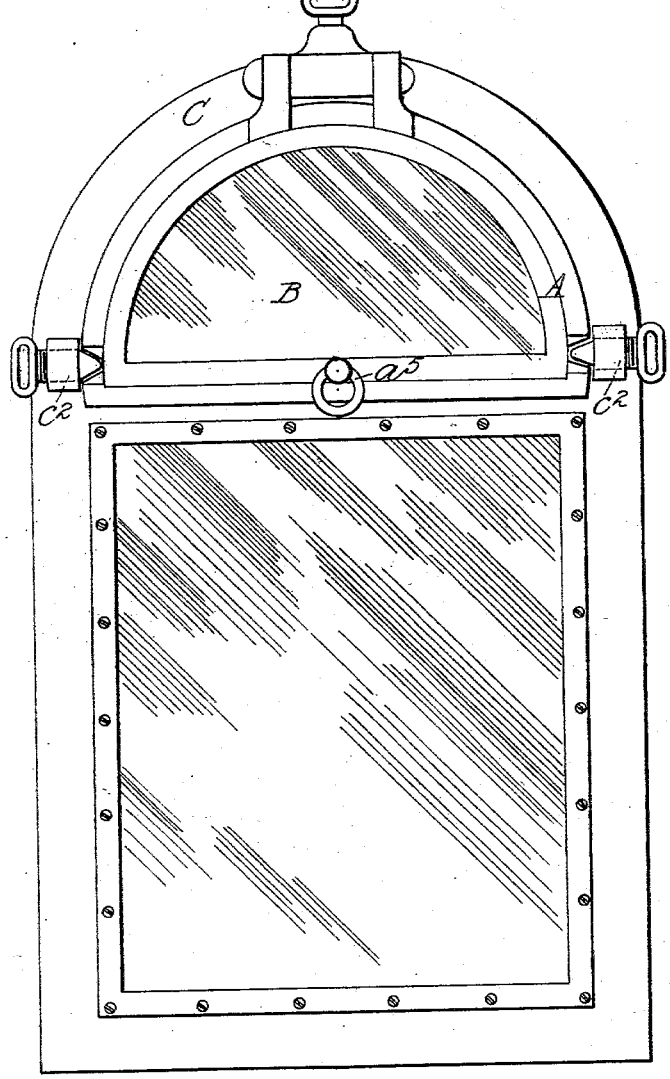

No. 743,599. Patented November 10, 1903.

UNITED STATES PATENT OFFICE.

THOMAS UTLEY, OF LIVERPOOL, ENGLAND.

SHIP'S AIR AND LIGHT PORT.

SPECIFICATION forming part of Letters Patent No. 743,599, dated November 10, 1903.

Application filed February 5, 1903. Serial No. 142,031. (No model.)

*To all whom it may concern:*

Be it known that I, THOMAS UTLEY, manufacturer, a subject of the King of Great Britain, residing at Sefton House, Crosby Green, West Derby, Liverpool, England, have invented certain new and useful Improvements in or Relating to Ships' Air and Light Ports, of which the following is a specification.

This invention has reference to ships' air and light ports, and has for its object to provide increased facility for ventilating the ship by means of said air and light ports.

According to my said invention I so construct and mount the light or window and its socket that the glass-holder or movable frame or its socket may be moved in a direction approximately at right angles to the plane of its glass, so as to bring it into position for providing an air-space or ventilation-aperture all around the periphery of the glass-holder or frame without turning the light or shutter about its hinge. In some circumstances a shutter opened in the above manner would be capable of admitting air for the ventilation of the ship where the opening or turning of said shutter about its hinge would have little or no ventilating effect. Moreover, as the aforesaid movement of the shutter is also approximately at right angles to the plane of the washer or jointing material of the shutter, said washer or jointing material lies in contact with its seat or socket at every point when the shutter is moved into its closed position. I am thus enabled to close the said shutter in a more air and water tight manner than heretofore, as I obviate the disadvantage possessed by hinged ships' shutters as heretofore ordinarily constructed that the part of the washer or jointing material that lies nearest to the hinge comes soonest into contact with its seat or socket when the shutter is closed, thereby causing the portion of the glass-holder or frame that is diametrically opposite to the hinge to stand out from the socket until pressure has been applied to it by the screws. I may also employ, in conjunction with the aforesaid arrangement, a louver ventilating device of any appropriate kind, with or without a valve or valves.

In order that my invention may be clearly understood and readily carried into effect, I will now describe the same more fully with reference to the accompanying drawings, in which—

Figure 1 is a view of a closed port-hole shutter embodying the features of my invention, said view being taken from the inner side of the shutter and representing the latter as closed. Fig. 2 is a vertical section taken approximately on the line 2 2 of Fig. 1. Fig. 3 is a similar section, except that the shutter is represented in its ventilating position. Fig. 4 is a vertical section showing one form of arrangement for applying my invention to a side light. Fig. 5 is a view in front elevation, showing the improvements of this invention as applied to a rectangular window. Fig. 6 is a view of another form of rectangular window with which the improvements are combined.

A is the glass-holder or frame, provided with the hinge $a$.

B is the glass, and C the shutter-socket.

The glass-holder or frame, glass, and socket may be circular, as shown in Figs. 1 to 4, or rectangular, as shown in Figs. 5 and 6.

D, Figs. 2 and 3, is a louver, and E E are valves adapted to be employed in conjunction therewith.

The hinge-pin $a'$ is adapted to slide within a slot $c'$ in a fixed bracket or carrier $c$ upon the socket C.

Radial wedge-screws $c^2$ $c^2$ are preferably employed for maintaining the lights or shutters in their closed positions in rough weather or when ventilation is not required, any convenient number of said screws being employed. The screw that is situated diametrically opposite to the hinge $a$ serves also as a support or holder for the shutter when the latter is drawn inward or opened, as represented in Fig. 3. For this purpose the inner end $c'$ of the screw is provided with a projection $c^3$ or its equivalent, adapted to enter and engage with a corresponding recess $a^3$ in the edge or periphery of the glass-holder or frame.

On its outward or seaward side the glass-holder or frame A may carry an annular washer $a^4$, adapted when the shutter is closed to make a tight joint with a corresponding fixed annular flange or jointing member or seat $c^4$ upon the socket.

The light or shutter may be furnished with means for retaining its hinge-pin $a'$ in either of the positions it assumes when the light or shutter is closed, as represented in Fig. 2, and when said light or shutter is opened, as represented in Fig. 3. For this purpose the bracket or carrier $c$ of the hinge $a$ may be provided with a pinching-screw or equivalent retaining device $c^5$, the point $c^6$ of which is wedge-shaped and enters the aforesaid slot. When the shutter is opened in the manner above described, the wedge-like end $c^6$ of the screw $c^5$ presses against the hinge-pin $a'$ on the outer or seaward side of the latter, and when the shutter is closed said screw presses with its wedge-like end against the opposite side of the hinge-pin.

In addition to the above vertical open position the shutter can be opened in an angular manner by turning it about the hinge $a$, a retaining device of any appropriate kind being employed for maintaining said shutter in its angularly-opened position. In the examples illustrated in the drawings said retaining device comprises a ring $a^5$, adapted to engage with a hook or the like arranged in any convenient position in the well-known way.

Referring more particularly to the arrangement shown in Figs. 1 and 3, which represent a light or shutter employed in connection with a port-hole, said light or shutter may, as already mentioned, be used in conjunction with a louver D and one or more valves E, the construction of which is well known, this arrangement having the advantages that it economizes space and weight and that it permits the glass-holder or frame to lie close to the side of the vessel.

In the arrangement shown in Fig. 4, where my improved light or shutter is represented as a side light, the aforesaid louver and valve arrangement may obviously be dispensed with.

In some cases the louver arrangement may be retained and the valves dispensed with, as shown in Fig. 6.

In both the forms of construction shown it will be obvious that I overcome the throwing-back effect of the washer or jointing material $a^4$ ordinarily experienced in ships' shutters, the slot $c'$ in the bracket or carrier $c$ enabling the washer $a^4$ upon the glass-holder or frame A to be pressed properly against the portion $c^4$ of the socket C.

The lights or shutters may be circular, rectangular, or of other desired shape.

What I claim, and desire to secure by Letters Patent of the United States, is—

1. In a ship's light and air port the combination of a hinged frame or shutter, means for enabling said frame or shutter to be shifted bodily in a direction approximately at right angles to the plane thereof, and means for locking said frame or shutter in its open position.

2. In a ship's light and air port the combination of a glazed frame, means for enabling said frame to be shifted in a direction approximately at right angles to the plane of said frame and a tapering screw capable of retaining said frame in either of its extreme positions.

3. In a ship's light and air port the combination of a glazed frame, means for enabling said frame to be shifted in a direction approximately at right angles to the plane of said frame, a tapering screw capable of retaining said frame in either of its extreme positions, and a projection on said screw adapted to engage with a corresponding recess in the periphery of the frame.

4. In a ship's light and air port, the combination of a hinged frame or shutter having at least one of its sides rectilinear, and means for enabling said frame or shutter to be shifted bodily in a direction approximately at right angles to the plane of said frame or shutter.

5. In a ship's light and air port, the combination of a hinged rectangular frame or shutter, and means for enabling said frame or shutter to be shifted bodily in a direction approximately at right angles to the plane of said frame or shutter.

6. A ship's light and air port comprising in combination a stationary socket, a hinged frame or glass-holder having at least one of its sides rectilinear and means for enabling said frame or glass-holder to be shifted bodily without turning it about its hinge.

7. In a ship's light and air port the combination of a hinged frame or glass-holder, means for enabling said frame or glass-holder to be opened without turning it about its hinge, and means for locking said frame or glass-holder in either its closed or its opened position.

8. In a ship's light and air port the combination of a fixed socket, a hinge capable of both angular and lateral movement in the part that carries it, a glazed frame carried by said hinge, and means for retaining said frame in position when adjusted.

9. In a ship's light and air port the combination of a socket, a glazed frame, a hinge supporting said frame and capable of both angular and lateral movements in the part that carries it, means for locking said frame in position when adjusted, and means for locking said hinge at either extreme of its sliding movement.

10. In a ship's light and air port the combination of a glazed frame, a hinge supporting said frame and capable of both angular and linear motion, means for locking said frame in either its closed or its parallel open position, means for locking said hinge at either extreme of its sliding movement, and means for retaining said frame in its angular open position.

11. In a ship's light and air port the combination of a socket, a glazed frame, a hinge on said frame capable of both angular and linear motion on the part that carries it, a pinching-screw for locking said hinge at either extreme of its linear motion, wedge-screws for locking said frame in its closed position, a projection on one of said screws adapted to engage with a corresponding recess in the frame for retaining said frame in its parallel open position, and means for retaining said frame in its angular open position.

12. In a ship's light and air port the combination of a frame, means for enabling said frame to be shifted bodily in a direction approximately at right angles to the plane of said frame, means for locking said frame in its open position, and a supplementary ventilator in the frame or setting of the port capable of acting when said frame is closed.

13. In a ship's light and air port, the combination of a glazed rectangular frame, a hinge supporting said frame and capable of both angular and linear motion in the part that carries it, means for locking said frame in position when adjusted, and a supplementary ventilator in the frame or setting of the port for use when said frame is shut.

14. In a ship's light and air port the combination of a frame or shutter, a hinge supporting said frame or shutter, and capable of both angular and linear motion, means for locking said frame or shutter in either its closed or its parallel open position, a supplementary ventilator in the frame or setting of the port capable of acting when said frame or shutter is closed and means for preventing water but not air from passing through said ventilator.

15. In a ship's light and air port the combination of a glazed frame, a hinge supporting said frame and capable of both angular and linear motion, means for locking said hinge at either extreme of its linear motion, means for locking said frame in its closed position, means for locking said frame in its parallel open position, means for locking said frame in its angular open position, a supplementary ventilator in the frame or setting of the port capable of acting when said frame is closed, and means for preventing water but not air from passing through said ventilator.

16. In a ship's light and air port the combination of a hinged frame or shutter, means for enabling said shutter to be shifted in a direction approximately at right angles to the plane thereof, a supplementary ventilator in the frame or setting of the port capable normally of acting when said frame or shutter is closed, and means for shutting said ventilator in the event of water approaching it.

17. In a ship's light or air port the combination of a hinged frame or shutter, means for enabling said frame or shutter to be shifted in a direction approximately at right angles to the plane thereof, a supplementary ventilator in the frame or setting of the port capable of acting when said frame or shutter is closed, a baffle for preventing water but not air from passing through said ventilator and means for closing said ventilator in the event of water passing said baffle.

18. In a ship's light and air port the combination of a glazed frame, a hinge supporting said frame and capable of both linear and angular motion in the part that carries it, means for locking said hinge at either extreme of its linear motion, means for locking said frame in its closed position, means for locking said frame in its parallel open position, means for locking said frame in its angular open position, a supplementary ventilator in the frame or setting of the port capable of acting when said frame is closed, a baffle for preventing water but not air from passing through said ventilator, and means for closing said ventilator in the event of water accidentally passing said baffle.

In testimony whereof I have hereunto set my hand, in presence of two subscribing witnesses, this 24th day of January, 1903.

THOMAS UTLEY.

Witnesses:
  JOHN H. KENION,
  J. B. BOOTH.